US008980471B2

(12) United States Patent
Muldoon et al.

(10) Patent No.: US 8,980,471 B2
(45) Date of Patent: Mar. 17, 2015

(54) CARBON-SULFUR COMPOSITES ENCAPSULATED WITH POLYELECTROLYTE MULTILAYER MEMBRANES

(71) Applicant: Toyota Motor Eng. & Mtfg. North America, Erlanger, KY (US)

(72) Inventors: John Muldoon, Saline, MI (US); Claudiu B. Bucur, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 116 days.

(21) Appl. No.: 13/773,072

(22) Filed: Feb. 21, 2013

(65) Prior Publication Data

US 2014/0234707 A1 Aug. 21, 2014

(51) Int. Cl.
*H01M 4/02* (2006.01)
*H01M 4/62* (2006.01)
*H01M 4/58* (2010.01)
*H01M 4/36* (2006.01)

(52) U.S. Cl.
CPC ............... *H01M 4/622* (2013.01); *H01M 4/58* (2013.01); *H01M 4/366* (2013.01); *H01M 4/362* (2013.01)
USPC ........................................................ 429/211

(58) Field of Classification Search
CPC .... Y02E 60/122; H01M 4/362; H01M 4/366; H01M 4/38; H01M 4/136; H01M 10/052
USPC ...................... 429/209, 211, 212, 213, 218.1; 427/113, 122
See application file for complete search history.

(56) References Cited

U.S. PATENT DOCUMENTS

| | | |
|---|---|---|
| 5,792,575 A | 8/1998 | Naoi et al. |
| 7,713,629 B2 | 5/2010 | Schlenoff |
| 2002/0149656 A1* | 10/2002 | Nohr et al. ...................... 347/95 |
| 2004/0048164 A1 | 3/2004 | Jung et al. |
| 2009/0181303 A1 | 7/2009 | Neudecker et al. |
| 2010/0092809 A1 | 4/2010 | Drzal et al. |
| 2011/0097623 A1 | 4/2011 | Marinis, Jr. et al. |
| 2011/0165471 A9 | 7/2011 | Skotheim et al. |
| 2012/0244444 A1 | 9/2012 | Chiang et al. |
| 2012/0264017 A1* | 10/2012 | Nazri et al. ................ 429/218.1 |
| 2012/0315545 A1 | 12/2012 | Son et al. |
| 2013/0164615 A1* | 6/2013 | Manthiram et al. .......... 429/212 |
| 2013/0295469 A1* | 11/2013 | Liang et al. .................... 429/335 |
| 2013/0330619 A1* | 12/2013 | Archer et al. ................. 429/213 |

OTHER PUBLICATIONS

Gero Decher, et al., "Fuzzy Nanoassemblies: Toward Layered Polymeric Multicomposites" Science vol. 277, 1232, Aug. 29, 1997. www.sciencemag.org.
Paula T. Hammond, et al., "Electrochemically enabled Polyelectrolyte Multilayer Devices: From Fuel Cells to Sensors" This Journal is © The Royal Society of Chemistry 2007, Soft Matter, 2007, 3, 804-816, www.rsc.org/softmatter.

(Continued)

*Primary Examiner* — Stewart Fraser
(74) *Attorney, Agent, or Firm* — Oblon, McClelland, Maier & Neustadt, L.L.P.

(57) ABSTRACT

A carbon-sulfur composite coated with a membrane containing alternating layers of oppositely charged polyelectrolytes is provided. A cathode containing the coated carbon-sulfur composite and a battery constructed with the cathode are also provided.

15 Claims, 6 Drawing Sheets (56) References Cited

OTHER PUBLICATIONS

Gleb B. Sukhorukov, et al., "Smart Inorganic/Organic Nanocomposite Hollow Microcapsules" Inorganic/Organic Microcapsules, Angew. Chem. Int. Ed. 2003, 42, 4472-4475, www.angewandte.org.

Ravi S. Kane, et al., "Noncovalent Functionalization of Graphite and Carbon Nanotubes with Polymer Multilayers and Gold Nanoparticles" 2003 American Chemical Society, Nano Letters, vol. 3, No. 10, 1437-1440, 2003.

Edwin Donath, et al., "Novel Hollow Polymer Shells by Colloid-Tem-plated Assembly of Polyelectrolytes" Communication, Angew. Chem. Int. Ed. 1998, 37, No. 16, 2201-2205.

Yi Cui, et al., "Improving the Performance of Lithium-Sulfur Batteries by Conductive Polymer Coating" ACSNANO, vol. 5, No. 11, 9187-9193, 2011, www.acsnano.org.

Peter G. Bruce, et al., "Li-$O_2$ and Li-S Batteries with High Energy Storage" Nature Materials, vol. 11, Jan. 2012, www.nature.com/naturematerials.

Hailiang Wang, et al., "Graphene-Wrapped Sulfur Particles as a Rechargeable Lithium-Sulfur Battery Cathode Material with High Capacity and Cycling Stability" ACS Publications, 2011 American Chemical Socity, Nano Letter. 2011, 11, 2644-2647.

* cited by examiner

CARBON-SULFUR COMPOSITES ENCAPSULATED WITH POLYELECTROLYTE MULTILAYER MEMBRANES

BACKGROUND OF THE INVENTION

1. Field of the Invention

This invention is directed to novel carbon-sulfur composites which are suitable for utility as an electrode active material. In particular, the invention is directed to carbon-sulfur composite particles which are coated with a membrane of layers of polyelectrolytes, each successive layer having a charge opposite to the previous layer. The invention is also directed to a cathode containing the membrane coated carbon-sulfur composite and an electrochemical cell or battery containing the cathode. The invention is further directed to a lithium-sulfur battery containing the membrane coated carbon-sulfur composite cathode.

2. Discussion of the Background

In an ongoing effort to develop alternative vehicle energy power sources to the combustion engine, one area of development has been a plugin electric vehicle. To date much of the effort has been directed to lithium ion batteries as a power source for such vehicles. However, to become mainstream and to compete with the combustion engine in terms of cost and driving range, a significant improvement in the energy density of lithium ion batteries is necessary. The Holy Grail of post lithium ion research is to increase energy densities by utilization of conversion cathodes with high volumetric capacities such as sulfur or oxygen in combination with a pure metal anode. As an active cathode material, elemental sulfur can provide five times higher capacity than conventionally employed materials based on transition metal oxides or phosphates.

Although studies in lithium/sulfur battery date back to the early 1960's, the system has yet become commercially significant due to limited cycle life. Various problems have hindered the practical use of this highly attractive cathode including the insulating nature of sulfur which retards its reduction and poor electrode stability owing to the solubility in the electrolyte of the polysulfides generated during reduction of sulfur ($Li_2S_x$, x=8, 6, 5 and 4). Over the last fifty years, methods for preventing migration of polysulfides have been intensively investigated by research teams worldwide. Significant advancements have been achieved by optimizing the electrolyte composition or replacing the liquid based electrolyte with polymeric electrolytes.

One approach to solving this problem is to restrain the polysulfides generated by constraint of the sulfur into metal organic frameworks or a conductive host such as porous carbon. However, this technique offers only a partial confinement to the polysulfide species, and capacity losses observed after 100 cycles are often too great to provide useful lifetime. In other approaches to further confine the highly polar polysulfide species, the surface of the carbon has been adjusted by functionalizing with inorganic oxides or polymers with the aim of providing an exterior coating to restrict migration of polysulfides.

In order to extend the lifetime beyond that offered by carbon/sulfur composites, the present inventors envision encapsulation of an active sulfur electrode material within thin membranes which would restrict the diffusion of polysulfides while allowing for diffusion of the lithium ion. Polyelectrolyte multilayer (PEML) assembly is known as a technique for producing thin fuel cell membranes and for the assembly of nanowires for lithium ion battery electrodes. Furthermore, graphite and carbon nanotubes have been functionalized with multilayer polymeric films.

PEML assembly was introduced by Decher et al. (Science 277, 1232(1997)) and involves the simple, sequential adsorption of oppositely charged polyions from a dilute solution onto a substrate. This tunable technique utilizes the complex formation between polyanions and polycations. With access to a wide range of polyion building blocks for the PEML capsule, this methodology gives access to a "Lego" set of membrane structures with infinite prospects for utility in the enhancement of the cycle life of lithium sulfur batteries. Since introduction by Decher et al., PEML type membranes have been employed in varying applications.

Hammond et al. (Soft Matter, 2007, 3, 804-816) provides a review of layer-by-layer (LbL) techniques and assemblies. Use of LbL to form a cathode containing $LiCoO_2$ and carbon is described among other systems. Hammond states: "Using the right combination of materials, such as a polymer electrolyte and an active redox electrode material, the LbL technique improves the specific capacity and performance of battery electrodes by maximizing the reactive area."

Sukhorukov et al. (Angew. Chem. Int. Ed. 2003, 42, 4471-4475) describes formation of inorganic/organic nanocomposite microcapsules. Capsule shell layers of poly(allylamine hydrochloride (PAH) and poly(styrene sulphonate) (PSS) over cores of $Fe_2O_3$, $Y_2O_3$ and calcium hydroxyapatite are described. Utility of the capsules to contain carbon/sulfur composites or use as electrode materials is not disclosed or suggested.

Kane et al. (Nano Letters, 2003, Vol. 3, No. 10, 1437-1440) describes preparing polymer multi-layers on the surfaces of graphite, carbon SWNT's and carbon MWNT's. Described polymer layer sequences included starting at the carbon surface, a hydrolyzed-poly(styrene-alt-maleic anhydride) (h-PSMA), polyethyleneimine (PEI), polyacrylic acid (PAA) and PEI. Layer coating of carbon/sulfur composites or use as electrode materials is not disclosed or suggested.

Donath et al. (Angew. Chem. Int. Ed. 1998, 37, No. 16, 2201-2205) describes micron-size polyelectrolyte shells of poly(sodium styrenesulfonate)(PSS) and poly(allylamine hydrochloride)(PAH). Hollow spheres are prepared by deposition of alternating oppositely charged polyelectrolyte layers from dilute solution onto melamine formaldehyde colloidal particles. After formation of the polyelectrolyte shell, the colloidal particles are decomposed and removed from the resulting hollow shells.

Cui et al. (ACSNANO, Vol. 5, No. 11, 2011, 9187-9193) describes a cathode prepared by drop casting a solution containing a mesoporous carbon/sulfur composite coated with commercially available solution of poly(3,4-ethylenedioxythiophene)/poly(styrene sulphonate) (PEDOT:PSS). Description of testing of the cathode in a cell with a lithium anode and lithium bis(trifluoromethanesulfonyl)imide in 1,3-dioxolane and 1,2-dimethoxyethane is disclosed. Cui does not disclose coating the mesoporous carbon/sulfur composite with alternating layers of oppositely charged polyelectrolytes.

Bruce et al. (Nature Materials Vol. 11, 2012, 19-29) review problems associated with development of high capacity Li—S batteries and describes technical advances toward addressing these problems. The design of porous composite cathodes containing sulfur which are capable of delivering electrons efficiently to the S as well as trapping the soluble polysulfides is described. Further, cathodes based on ordered nanostructured mesoporous carbon-sulfur composites are described as providing higher and more sustained, reversible capacities. A mesoporous carbon/sulfur composite with alternating layers of oppositely charged polyelectrolytes is not described nor suggested as a cathode material.

Wang et al. (Nano Letters, 2011, 11, 2644-2647) describe a graphene-sulfur composite as a cathode material for a Li—S cell. PEG-containing surfactant coated sulfur particles wrapped in grapheme oxide sheets containing carbon black are prepared and annealed to form a cathode of a coin cell with a Li anode and lithium bis(trifluoromethanesulfonyl) imide in 1,3-dioxolane and 1,2-dimethoxyethane as electrolyte. Coating of a carbon/sulfur composite with alternating layers of oppositely charged polyelectrolytes is not disclosed.

Son et al. (U.S. 2012/0315545) describes a lithium-sulfur battery having a hydrophilic polysulfide confinement layer placed between the cathode and the separator. The polysulfide confinement layer serves to minimize the amount of lithium polysulfide formed at the cathode which migrates from the cathode reaction area. A cathode constructed of sulfur, conductive material and binder applied to an aluminum collector is described. The polysulfide confinement layer is constructed by grafting PEG onto a porous PE or PP membrane, subjecting the grafted material to an oxygen plasma treatment and grafting a silane onto the PEG. Thus a porous hydrophilic membrane with a PEG polymer brush attached to the surface is formed. A mesoporous carbon/sulfur composite with alternating layers of oppositely charged polyelectrolytes is not described nor suggested as a cathode material.

Marinis et al. (U.S. 2011/0097623) describes batteries having electrodes which may have a plurality of protrusions and describes a nonporous electrolyte disposed on the electrode. Among structures suitable to form the electrolyte, is described a polyelectrolyte multilayer film which may be formed by a layer to layer deposition process. Marinis does not describe sulfur as a cathode material.

Naoi et al. (U.S. Pat. No. 5,792,575) describes a lithium-sulfur secondary battery containing a cathode composed of a sulfur compound, a highly basic polymer and a conductive material. Examples of the highly basic polymer include polyvinyl pyridine and polyvinyl pyrrolidone. The sulfur compound is a disulfide or polysulfide and the highly basic polymer is disclosed as trapping lithium thiorate formed during discharge within the cathode. Naoi does not disclose or suggest a coating of alternating layers of oppositely charged polyelectrolytes.

Schlenoff (U.S. Pat. No. 7,713,629) describes polyelectrolyte films of perfluorinated charged polymer layers which are useful in providing hydrophobic surfaces to articles such as carpet, shoes, metal surfaces, particles. Use as membranes for fuel cells, coatings for anti-friction surfaces, and coatings for electroluminescent materials is suggested. Schlenoff describes that to obtain good adhesion to a surface, a layer of polyethyleneimine may first be applied followed by layer by layer application of negative and positive polyelectrolyte. Poly(dimethyldiallyl ammonium chloride) and poly(styrenesulfonic acid) are listed as nonfluorinated polyelectrolytes. Schlenoff does not disclose or suggest coating of a carbon/sulfur composite with alternating layers of oppositely charged polyelectrolytes nor any utility of the hydrophobic fluorinated polyelectrolyte complex films as an electrode material.

Neudecker et al. (U.S. 2009/0181303) describes a multilayered thin film which is used to encapsulate an electrochemical device such as a thin film battery. Neudecker does not describe polyelectrolyte alternating layers and is not directed to electrode structure or lithium-sulfur batteries.

Jung et al. (U.S. 2004/0048164) describes design of an electrolyte system for a lithium-sulfur battery. The electrolyte system contains a mixture of dimethoxyethane, dioxolane and diglyme. The dimethoxyethane and diglyme dissolve polysulfide and the dioxolane is described as generating a protective polymer coating on the lithium surface during charge and discharge. The cathode may contain elemental sulfur, electrically conductive materials and a binder. Jung describes a separator as being multi-layers of polyethylene and poly propylene. Jung does not disclose or suggest a cathode containing a carbon/sulfur composite with alternating layers of oppositely charged polyelectrolytes.

Drzal et al. (U.S. 2010/0092809) describes films of exfoliated graphite nanoparticles which can be formed by layer by layer application of polyelectrolyte dispersions of the graphite nanoparticles. Utility of the electrically conductive flexible thin films in lithium ion storage batteries and as a low cost alternative to carbon nanotubes is suggested. Drzal does not describe a lithium sulfur battery nor is utility of the graphite nanoparticles films for the construction of a sulfur cathode disclosed or suggested.

Skotheim et al. (U.S. 2011/0165471) describes an anode for an electrochemical cell containing lithium and multiple protective layers which are ion conducting. Electrically conductive polymers, ionically conductive polymers, sulfonated polymers and hydrocarbon polymers are indicated as suitable. Layer-by layer application of oppositely charged polyelectrolytes is not described. Active sulfur containing cathodes are described as containing conductive fillers and binders. Skotheim does not describe or suggest carbon/sulfur composite with alternating layers of oppositely charged polyelectrolytes as a cathode material.

Chiang et al. (U.S. 2012/0244444) describes construction of a porous electrode, especially for a small battery. The porous sintered electrode is a ceramic material such as $LiCoO_2$. Chiang describes that a polyelectrolyte multilayer film may be prepared by a layer-by-layer deposition process but does not describe a cathode having sulfur as an active component and does not describe a carbon/sulfur composite with alternating layers of oppositely charged polyelectrolytes as a cathode material.

None of these references discloses or suggests carbon/sulfur composites which are coated by LbL methods to obtain a membrane of alternating polyelectroyte layers of opposite charge as a coating.

The inventors are directing effort and resources to the study of materials useful to produce a battery of sufficient capacity and cycle lifetime to be competitive with and replace a combustion engine as a power source as well as other utilities requiring a high capacity, high cycle lifetime battery. In addition, a battery suitable for large scale intermittent energy storage will also be important for storage of green energy such as provided by wind and solar generation methods.

Therefore, an object of the present invention is to provide a sulfur composition which is suitable for utility as an electrode active material for a battery having high capacity and high cycle lifetime.

A second object of the invention is to provide a cathode containing sulfur as an active material which is suitable for utility in a battery having high capacity and high cycle lifetime.

A third object of the invention is to provide a lithium-sulfur battery which has sufficient capacity and lifetime to be a viable energy source for a vehicle.

SUMMARY OF THE INVENTION

These and other objects have been achieved according to the present invention, the first embodiment of which provides a coated carbon-sulfur composite, comprising:

a core of carbon and sulfur or a sulfur compound; and in the order listed,

A) a coating of ionically charged polymer in contact with at least a portion of an outer surface of the core;

B) a layer of an ionically charged polymer having a charge opposite to the charge of the coating A) over the coating A); and C) a layer of another ionically charged polymer having a charge opposite to the charge of the layer B) and equal to the charge of the coating A) which is over the layer B).

In another embodiment according to the invention, at least one further layer D) of an ionically charged polymer having a charge opposite to the charge of the layer C) is on the charged layer C); and optionally, a layer E) of another ionically charged polymer having a charge opposite to the charge of the at least one layer D) is on the charged layer D) and equal to the charge of the coating A).

In a highly preferred embodiment, according to the present invention the layer E) is present and further combinations of layers D') of an ionically charged polymer having a charge opposite to the charge of the layer E) on the charged layer E); and layers E') of another ionically charged polymer having a charge opposite to the charge of the at least one layer D') on the charged layer D') and equal to the charge of the coating A) are present. The layers of like charge may be the same polymer or may be different polymers.

In a further preferred embodiment, the core comprises a porous carbon host and the sulfur or sulfur compound is infused into the porous carbon host.

In a further embodiment, the ionically charged coating polymer of A) is a polyethyleneimine.

In another preferred embodiment, the present invention provides a cathode comprising the polyelectrolyte membrane coated carbon-sulfur composite as an active material and in a further preferred embodiment, a lithium-sulfur battery comprises the cathode.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

In a first embodiment the present invention provides a coated carbon-sulfur composite, comprising:

a core of carbon and sulfur or a sulfur compound; and in the order listed;

A) a coating of ionically charged polymer in contact with at least a portion of an outer surface of the core;

B) a layer of an ionically charged polymer having a charge opposite to the charge of the coating A) over the coating A); and C) a layer of another ionically charged polymer having a charge opposite to the charge of the layer B) and equal to the charge of the coating A) which is over the layer B).

In another embodiment according to the invention, at least one further layer D) of an ionically charged polymer having a charge opposite to the charge of the layer C) is on the charged layer C); and optionally, a layer E) of another ionically charged polymer having a charge opposite to the charge of the at least one layer D) is on the charged layer D) and equal to the charge of the coating A).

In a highly preferred embodiment, according to the present invention the layer E) is present and further combinations of layers D') of an ionically charged polymer having a charge opposite to the charge of the layer E) on the charged layer E); and layers E') of another ionically charged polymer having a charge opposite to the charge of the at least one layer D') on the charged layer D') and equal to the charge of the coating A) are present.

The successive layers of like charge may be the same polymer or may be differing polymers. Thus the membrane structure may be tailored to have specific properties by selection of polyelectrolyte layers and the number of layers applied.

The core of carbon and sulfur may be any nano-size range unit containing an intimate mixture of carbon and sulfur or carbon and a sulfur compound having at least disulfide bonds. Elemental sulfur is most preferred.

In a highly preferred embodiment, the core is a composite of porous carbon which has been infused with sulfur.

The content of sulfur in the core may be from 5 to 90% by weight, preferably from 6 to 80% and most preferably, from 7 to 60% by weight. These ranges include all ranges and subranges thereinbetween and all values therein.

According to the invention, a foundation layer is first applied to the carbon-sulfur composite core. The foundation layer may be applied by suspending the carbon/sulfur composite core under vigorous agitation in an aqueous solution of the foundation material, for example, bPEI, having an ionic strength controlled with LiCl. The mixture may then be centrifuged and the liquid decanted to obtain the particulate material. This first layer serves as a primer for further encapsulation with the polyelectrolyte membrane.

Although a branched polyethyleneimine is a preferred foundation material, the concept of the invention is not intended to be constrained to polyethyleneimine as a foundation. The surface of the carbon-sulfur composite has varying degrees of negative charge depending on the method employed and further treatment used to produce the carbon, and any polymer which is positively charged or capable of being made to carry a positive charge may be suitable as a foundation layer for a selected carbon material. Suitability may be determined by the methods described herein or by other methods known to one of skill in the art.

Once a foundation layer (A) is applied, encapsulation with a polyelectrolyte membrane may be achieved by suspending the carbon/sulfur composite with vigorous stirring and sonication while sequentially exposing the foundation coated carbon-sulfur composite to lithium chloride aqueous solutions of polyelectrolytes having alternating opposing charge.

With a positively charged foundation layer, the first applied polyelectrolyte (B) is one carrying a negative charge or one capable of being negatively charged. Although any such negative polyelectrolyte may be suitable, in a preferred embodiment, the negatively charged polyelectrolyte polymer may be selected from the group consisting of a salt of poly(styrene sulfonate), a salt of a polyacrylic acid, a salt of a polymethacrylic acid, a poly(2-acrylamido-2-methyl-1-propanesulfonic acid) and a salt of a poly(vinylbenzenephosphonic acid). The salt form of the polyelectrolyte may be any of the soluble salts and preferably may be any of lithium, sodium, potassium, ammonium or alkyl ammonium salts.

The next sequential layer (C) may be a polymer of positive charge having ammonium groups. In a highly preferred embodiment the polymer having ammonium groups may be selected from the group consisting of a poly(allylammonium salt), and a poly(diallyldimethylammonium salt). Although any soluble salt may be employed, halide salt is preferred and most preferably, a chloride salt may be used.

Figure 3A:
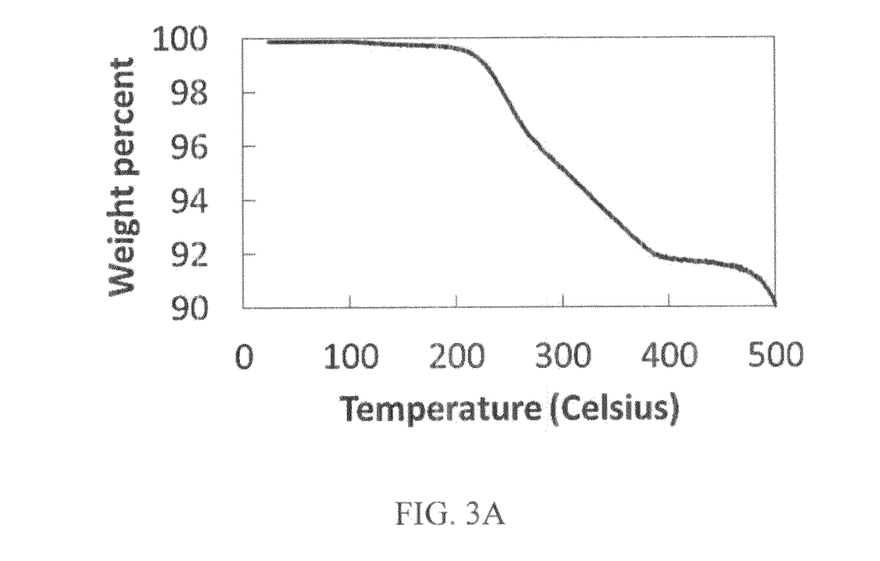
FIG. 3A shows a TGA curve of a carbon-sulfur composite containing 8% sulfur.

The inventors employed a spherical nanocarbon infused with sulfur as a model substrate to visually validate the concept of a membrane encapsulating a carbon/sulfur composite. The spherical nanocarbon was infused with 8% sulfur by weight by melt infusion (herein after described by CS-8-S) (FIG. 3A). The outer surface of the resulting carbon/sulfur composite was then primed for encapsulation by adsorption of a first layer of branched poly(ethyleneimine chloride) (bPEI) which placed a contiguous positively charged foundation for the construction of an encapsulating membrane of successive oppositely charged polyelectrolyte layers on the carbon-sulfur composite.

For example, in one embodiment, the CS-8-S polyethyleneimine foundation may be treated with lithium chloride aqueous solutions of the polyanion sodium poly(styrene sulfonate) PSS or the polycation poly(dimethyldiallyl ammonium chloride) PDAD. When the carbon substrate is exposed to a solution containing a polyion of opposite charge, a second polyion layer may be adsorbed and the sign of the surface charge reversed. PSS and PDAD may be deposited in a linear fashion so that the membrane thickness may be controlled by varying the number of layers. Although in theory any number of layers may be applied, in a preferred embodiment, the coating membrane may contain from 3 to 16 layers. Examples of PEML's of differing numbers of layers are described in the Examples.

Figure 1A:
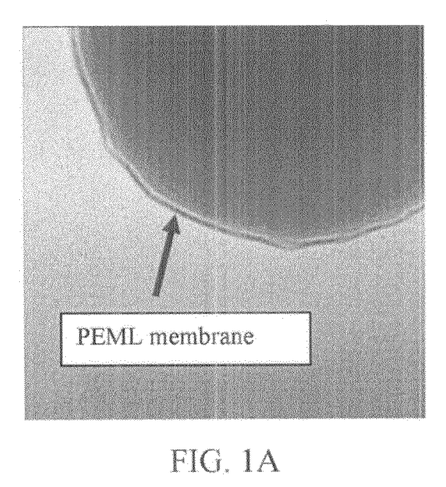
FIG. 1A shows a TEM image of a coated carbon-sulfur composite according to the invention.
Figure 1B:
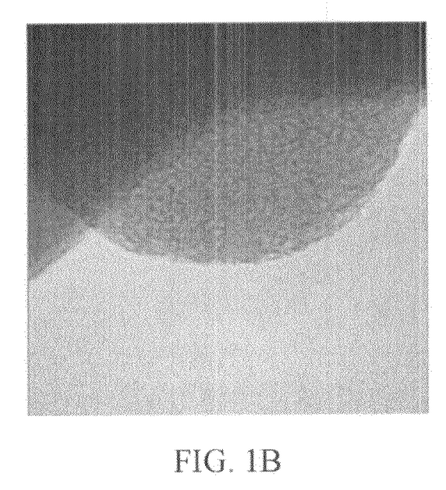
FIG. 1B shows a TEM image of a carbon-sulfur particle without an encapsulating membrane.
Figure 3B:
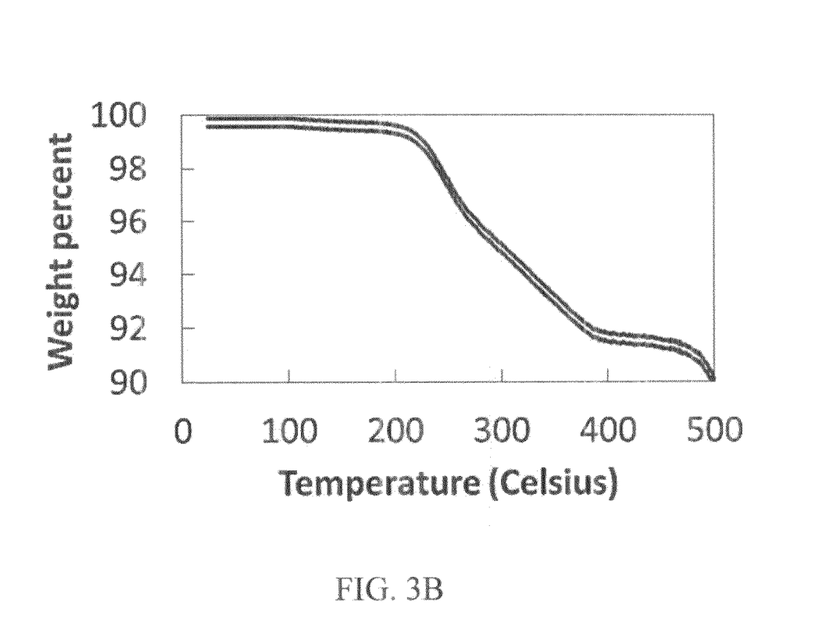
FIG. 3B compares the TGA weight loss of a carbon-sulfur composite before and after encapsulation.

The structure of the coated composite may be observed by TEM. For example FIG. 1A shows a carbon/sulfur composite surrounded by a ultrathin, amorphous membrane with a thickness of 5 nm which corresponds to a 5 layer membrane (PEI, (PSS-PDAD)2). This structure is absent in the non-encapsulated carbon/sulfur composite (FIG. 1B). TGA measurements validate that no sulfur is lost during the PEML assembly (FIG. 3B) In FIG. 3B the uppermost curve represents the TGA weight loss of a sample of CS-8-S before encapsulation and the lower line displays the weight loss by TGA after encapsulation.

The precise control over membrane assembly and its properties depends on a series of parameters. Despite the sequential adsorption mechanism, PEMLs possess an amorphous, interpenetrated inner bulk structure consisting of a majority of intrinsic sites between two oppositely charged polymers and a minority of extrinsic sites between solution ions and polyelectrolyte backbone charges. Diffusion through the membrane may be governed by the number of extrinsic sites which permits hopping of ions through the membrane system. The content of extrinsic compensation may be adjusted by the ionic strength of the solution in which assembly of the membrane occurs. In addition, the nature of the salt may also affect the number of extrinsic sites, even at identical ionic strengths.

Figure 2A:
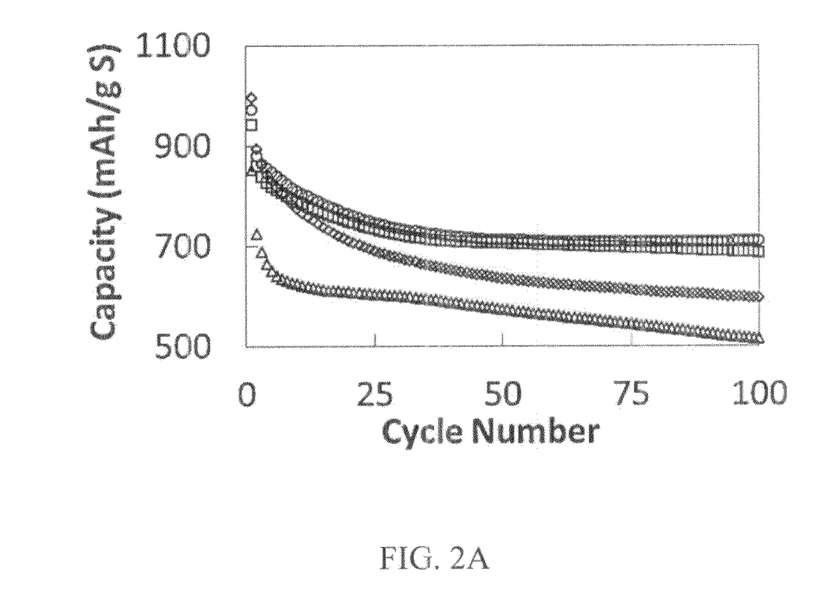
FIG. 2A shows discharge capacities for coin cells with cathodes according to the invention which were assembled with coated carbon-sulfur composites assembled from different ionic strengths of lithium chloride.

As described in the Examples, the effect of the ionic strength on PEML assembly may be examined by varying the concentration of lithium chloride during the construction of a 3 layer membrane (PEI, (PSS-PDAD)1). Coin cell batteries were prepared and evaluated for capacity loss over 100 cycles at a discharge rate of 1 C. The batteries containing PEML membranes assembled from high ionic strength solutions above 100 mM resulted in poor capacity retention because the higher number of extrinsic sites promotes the diffusion of both the lithium ion and the polysulfide ion (FIG. 2A). In FIG. 2A the discharge capacities for coin cells with cathodes containing TDA-57-S-PEML-3 assembled from different ionic strengths of lithium chloride are shown. The curve represented by rectangles is 10 mM, circles, 100 mM, triangles, 0.5M and diamonds, 1M LiCl.

Figure 2B:
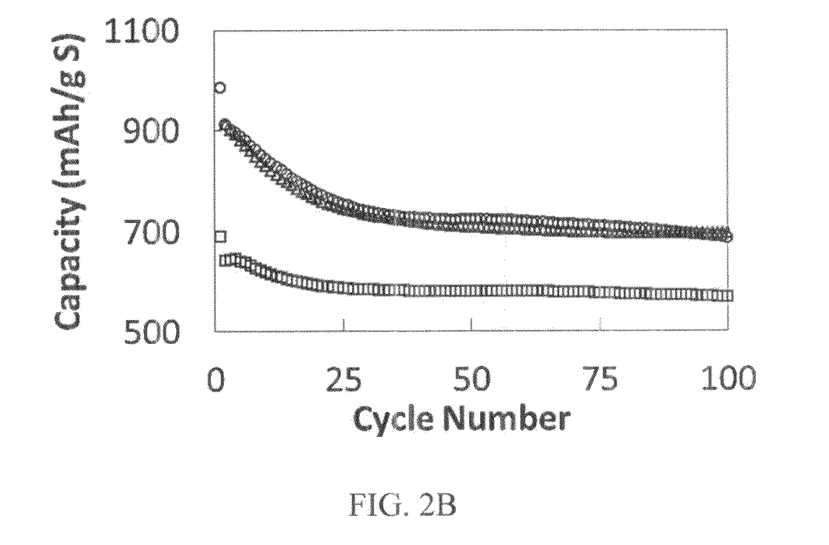
FIG. 2B shows discharge capacities for coin cells with cathodes according to the invention which were assembled with coated carbon-sulfur composites assembled with 3, 7 and 16 layer membranes.
Figure 2C:
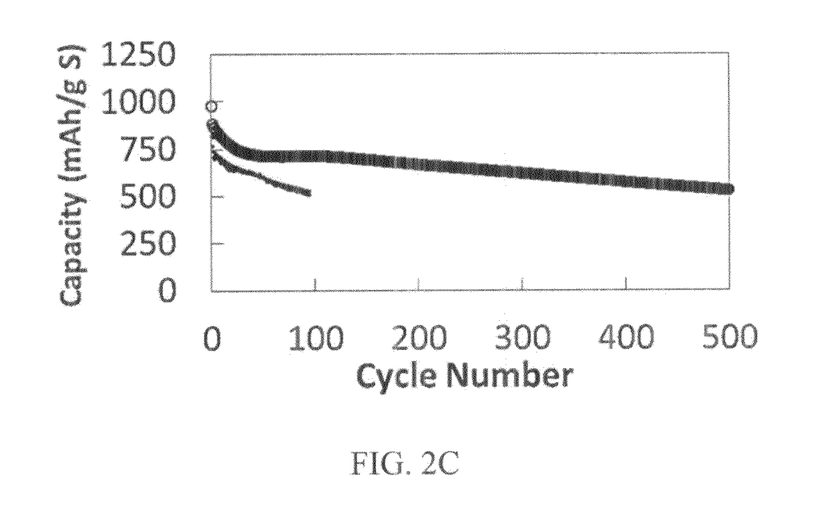
FIG. 2C shows the cycle stability of a cathode according to the invention in comparison to a cathode based on noncoated composite.
Figure 2D:
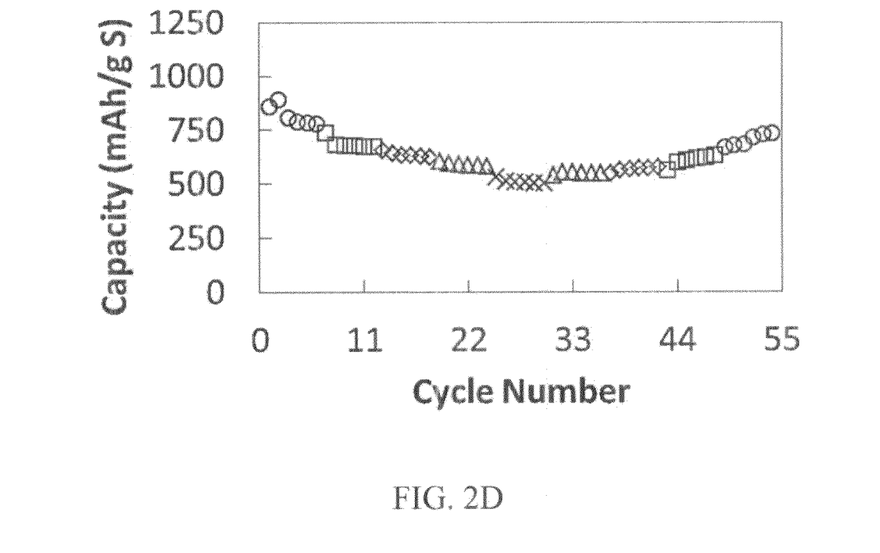
FIG. 2D shows the discharge capacities for coin cells according to the invention at different charge/discharge rates.

Thus, according to the invention, PEML membranes may be assembled from solutions containing from 10 to 500 mM LiCL, preferably 50 to 250 nM LiCl and most preferably 75 to 150 mM LiCl. In a most highly preferred embodiment PEML assembly is conducted from solutions containing 100 mM LiCl. Permeability of the PEML membrane may be governed not only by the number of extrinsic sites but also by the number of layers adsorbed. A higher number of adsorbed layers may decrease the PEML permeability to both the lithium and the polysulfide ions. This is consistent with the observation that sixteen adsorbed layers display a lower observed capacity but improved capacity retention at a discharge rate of 1 C, over 100 cycles (FIG. 2B). FIG. 2B shows the discharge capacities for coin cell with cathodes containing TDA-57-S coated with a three layer membrane (triangles), a 7 layer membrane (diamonds) and a 16 layer membrane (rectangles).

This suggests there is a tradeoff between maximizing observed capacity and its retention over cycling.

In a further embodiment, the present invention provides an electrode, preferably a cathode containing the PEML coated carbon-sulfur composites. A sulfur cathode may be prepared by mixing the membrane encapsulated carbon/sulfur composite with one or more binders and other materials conventionally employed to prepare a cathode structure. These materials may be mixed as a slurry, coated onto a metal foil, and dried. The methods of construction of a cathode employing an active material are conventionally known and any such method that is compatible with the PEML coated carbon-sulfur composites of the invention may be employed.

The cathode thus prepared may be employed in the construction of an electrochemical cell or battery in a conventionally known manner. In a preferred embodiment the cathode may be combined with an anode having lithium or magnesium as an active material. An anode of lithium or magnesium metal is more preferred and a lithium metal anode is the most preferred.

Thus, the present invention provides a lithium-sulfur battery comprising a lithium anode and a cathode comprising the coated carbon-sulfur composite.

Having generally described this invention, a further understanding can be obtained by reference to certain specific examples which are provided herein for purposes of illustration only and are not intended to be limiting unless otherwise specified.

EXAMPLES

Materials:

Poly(diallyldimethylammonium chloride) (PDAD, Polysciences), Mw=8,500; poly(4-styrene sulfonic acid), Mw=75,000 (PSS, Sigma Aldrich); polyethyleneimine, branched, Mw=10,000 (bPEI, Alfa Aesar); poly(2-acrylamido-2-methyl-1-propanesulfonic acid), Mw ave=2,000,000 (PAMPS, Sigma Aldrich); poly(3,4-ethylenedioxythiophene)-poly(styrene sulfonate), high conductivity grade (PEDOT:PSS, Sigma Aldrich); poly(acrylic acid), Mw=100,000 (PAA, Sigma Aldrich); polyethyleneimine "MAX", Mw=40,000 (1PEI, Polysciences) and lithium chloride, >=99.0% (Sigma Aldrich) were used as received for PEML assembly. SuperPLi from TIMCAL and a mixture of polyvinylidene fluoride/n-Methyl-2-pyrrolidone (PVDF/NMP) were used for cathode slurry preparation. Slurry dilutions were performed with the addition of cyclopentanone, ReagentPlus, >=99% (Sigma Aldrich). The carbon hosts for sulfur (purum p.a. >=99.5%, Sigma Aldrich) infusion were obtained from Synthonix. Inc (Synth-1) and from TDA. Inc (TDA-1). The electrolyte used in electrochemical cells was composed of 1M LiTFSI salt (purchased from 3M) in a 1:1 mixture of anhydrous 1,3-dioxolane (Sigma Aldrich) and 1,2-dimethoxyethane (Sigma Aldrich).

Methods:

Sulfur Infusion

Sulfur infusion was accomplished by a melt-diffusion strategy. The porous carbon support and sulfur were ground together, and heated to 150 C for 4 hours. The weight ratio of carbon/sulfur was adjusted based on the density of elemental sulfur and the porous carbon volume in pores less than 3 nm as measured by BET to allow for expansion of the pore content on full reduction to $Li_2S$. This method provided a 8% sulfur content by weight in the Synth-1 sample and a 57% sulfur content by weight in the TDA-1 sample.

To demonstrate the scale-up of the infusion method, a pilot scale carbon sample (TDA-1) provided by TDA. inc containing a surface area in excess of 2100 $m^2$/g with a pore volume of 1.35 cm3/g allowed for an infusion of 57% sulfur. In contrast to the Synth-1 carbon which benefits from a spherical surface area, TDA-1 is irregular in shape and more prone to coagulation.

PEML Membrane Encapsulation

PEML membrane encapsulation was carried out by sequentially exposing the carbon/sulfur composite to dilute aqueous solutions of oppositely charged polyions with the necessary ionic strengths of lithium chloride. A rinse step was always employed to clean the carbon/sulfur particle of any loosely bound polymer chains and ensure homogeneous coverage. For example a three layered PEML was built by first suspending 0.3 g of a carbon/sulfur composite by vigorously agitating for 4 minutes in a 50 ml, 10 mM aqueous solution of bPEI with an ionic strength of 100 mM LiCl followed by 1 minute sonication. The mixture was then centrifuged at 14,000 rpm and the liquid decanted. The solid material was then re-suspended and vigorously agitated for 4 minutes in a rinse solution containing only 100 mM LiCl followed by 1 minute sonication and centrifugation. This resulted in the adsorption of the first, positively charged layer of the PEML. The second, negatively charged layer was adsorbed by similar exposure to a dilute aqueous solution of PSS with an ionic strength of 100 mM LiCl also followed by a rinse. Finally, the third positively charged layer was adsorbed by exposure to a dilute aqueous solution of PDAD with an ionic strength of 100 mM LiCl followed by rinsing.

Steps two and three of this procedure were repeated such that any desired number of layers greater than three were adsorbed.

Electrochemistry.

Working electrodes were prepared by casting a 80 µM slurry containing the carbon/sulfur composite, 20% SuperP Li and 3% PVDF binder diluted as needed with NMP/cyclopentanone on a 12 µm Al foil current collector. The total cathode weight was maintained at approximately 3 mg. The electrodes were dried at 60° C. for 24 hours and then transferred inside the Ar-filled glove box for coin cell assembly. Lithium metal foil (1 mm thick) was used as the anode. 2032 stainless steel coin cells with a Celgard 2325 separator were used for electrochemical measurements. Charge and discharge rates were calculated assuming theoretical capacity for the total amount of sulfur in the cathode. BioLogic SAS, model VMP3, multi-channel Science Instruments potentiostats were used for electrochemical measurements. Data was processed with EC-Lab Software V10.02 with the corresponding VMP3 firmware, provided by Science Instruments.

Effect of Ionic Strength on PEML Assembly

To examine the effect of the ionic strength on PEML assembly the concentration of lithium chloride was varied during the construction of a 3 layer membrane (PEI, (PSS-PDAD)1). Coin cell batteries were then constructed and the capacity loss over 100 cycles for the batteries was determined. In order for the effect of the ionic strength to be more apparent the discharge rate was increased from 0.1 C to 1 C. Membranes assembled from high ionic strength solutions above 100 mM resulted in poor capacity retention because the higher number of extrinsic sites promoted the diffusion of both the lithium ion and the polysulfide ion (FIG. 2A). Based on these findings PEML membranes were always assembled from solutions containing 100 mM LiCl.

Permeability of the PEML membrane is governed by the number of extrinsic sites but also by the number of layers adsorbed. A higher number of adsorbed layers decreases the PEML permeability to both the lithium and the polysulfide ions. This is consistent with the observation that sixteen adsorbed layers display a lower observed capacity but improved capacity retention at a discharge rate of 1 C, over 100 cycles (FIG. 2B). This suggests there is a tradeoff between maximizing observed capacity and its retention over cycling.

Assembly and Evaluation of a Lithium-Sulfur Battery

A CS-8-S-PEML-5 (PEI, (PSS-PDAD)2) composite was slurried with SuperPLi and polyvinylidene fluoride binder and N-methyl-2-pyrrolidinone to form a slurry which was coated onto an aluminum foil and dried to prepare a cathode. The cathode was combined with a lithium foil as an anode to produce a coin cell. The electrolyte used in preparing the coin cell was 1M lithium bis(trifluoromethanesulfonyl)imide in a 1:1 mixture of 1,2-dimethoxyethane and 1,3-dioxolane.

Figure 1C:
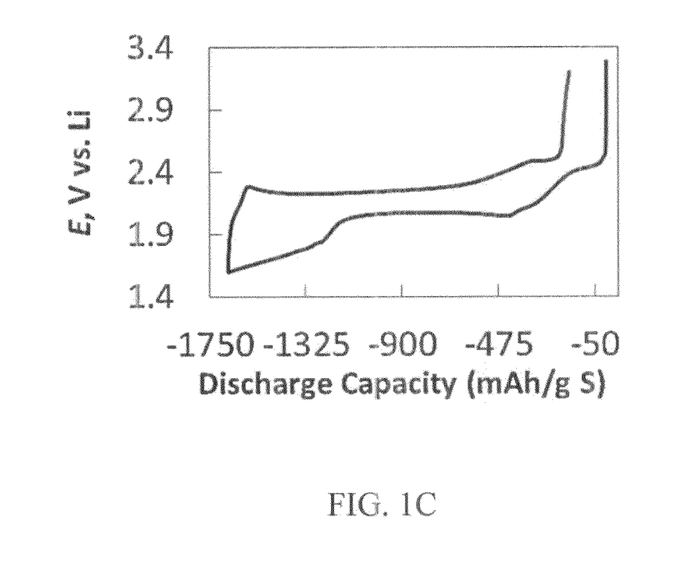
FIG. 1C shows an initial charge/discharge profile obtained with the material according to the invention.
Figure 3C:
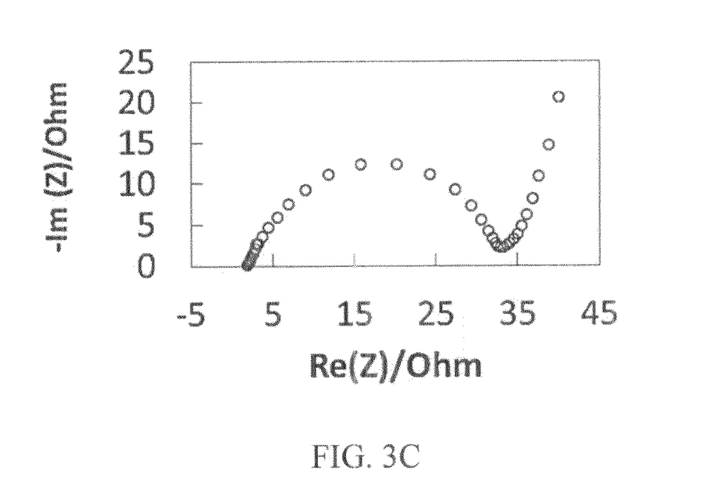
FIG. 3C shows the impedance spectrum of a coin cell containing a cathode according to the present invention.
Figure 3D:
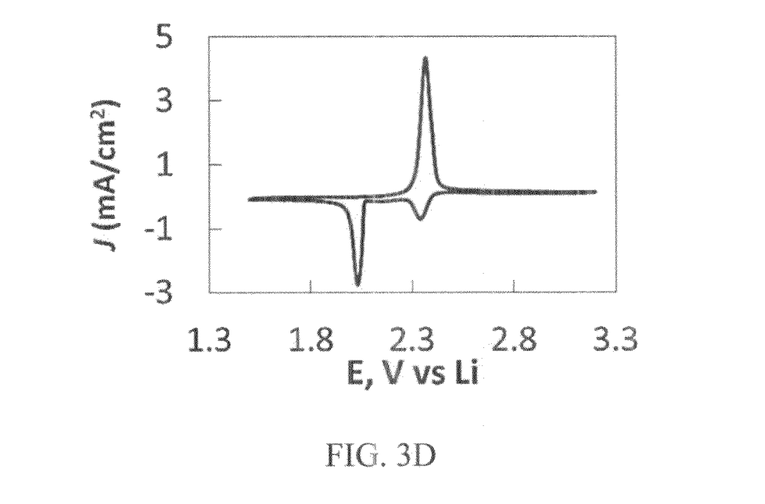
FIG. 3D shows a cyclic voltammogram of a coin cell containing a cathode according to the invention.
Figure 3E:
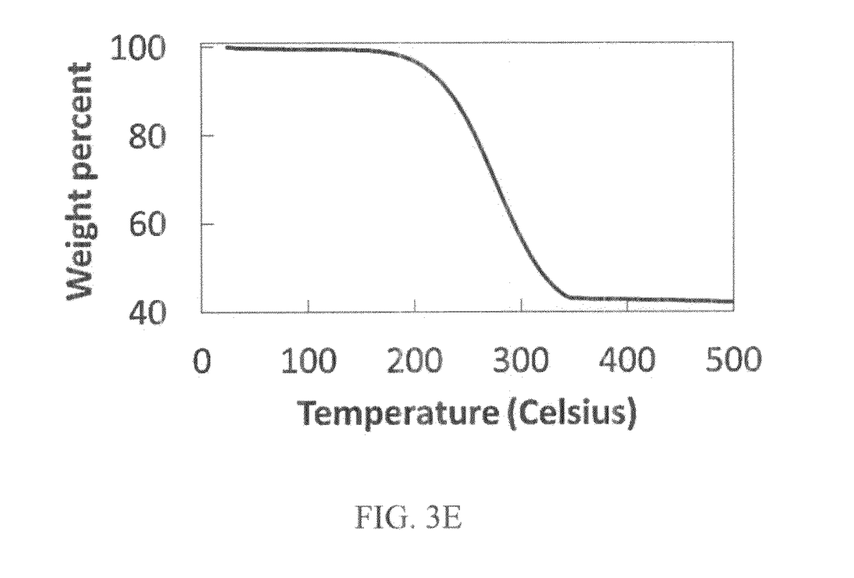
FIG. 3E shows a TGA curve of a sulfur infused porous carbon having 57% sulfur.

FIG. 1C shows the initial galvanostatic discharge/charge profile of the membrane encapsulated sulfur cathode (CS-8-S-PEML-5) at 0.1 C rate (1 C=1671 mA g−1, 1 hour discharge or charge equivalent). A discharge current of 0.1 C extracts theoretical capacity of 1671 mAh/g confirming that the membrane did not inhibit electronic or ionic transfer in CS-8-S-PEML-5 (impedance FIG. 3C). The discharge profile contained two typical plateaus which can be related to two corresponding reduction peaks in the cyclic voltammogram (FIG. 3D). The first plateau appears at 2.3V and represents the reductive formation of lithium polysulfides. The second plateau appears at 2.0V and corresponds to the further reduction of the polysulfides to $Li_2S$. On charging, only one plateau was distinguishable upon re-oxidation towards elemental sulfur.

The invention claimed is:

1. A coated carbon-sulfur composite, comprising:
a core of a porous carbon and sulfur or a sulfur compound; and in the order listed,
A) a coating of ionically charged polymer in contact with at least a portion of an outer surface of the core;
B) a layer of an ionically charged polymer having a charge opposite to the charge of the coating A) over the coating A); and
C) a layer of another ionically charged polymer having a charge opposite to the charge of the layer B) and equal to the charge of the coating A) which is over the layer B) wherein in the core the sulfur or sulfur compound is infused into the porous carbon.

2. The coated carbon-sulfur composite, according to claim 1, further comprising at least one further layer D) of an ionically charged polymer having a charge opposite to the charge of the layer C) on the charged layer C); and
optionally, a layer E) of another ionically charged polymer having a charge opposite to the charge of the at least one layer D) on the charged layer D) and equal to the charge of the coating A).

3. The coated carbon-sulfur composite, according to claim 2, comprising the layer E) and further comprising at least one further combination of layers D') of an ionically charged polymer having a charge opposite to the charge of the layer E) on the charged layer E); and
a layer E') of another ionically charged polymer having a charge opposite to the charge of the at least one layer D') on the charged layer D') and equal to the charge of the coating A).

4. The coated carbon-sulfur composite according to claim 1, wherein the core comprises sulfur infused into the porous carbon host and the sulfur is elemental sulfur.

5. The coated carbon-sulfur composite according to claim 1, wherein the ionically charged coating polymer A) is polyethyleneimine.

6. The coated carbon-sulfur composite according to claim 5 wherein the ionically charged polymer of the layer coating the ionically charged polymer is a negatively charged polyelectrolyte polymer.

7. The coated carbon-sulfur composite according to claim 6 wherein the negatively charged polyelectrolyte polymer is one having an acidic functionality.

8. The coated carbon-sulfur composite according to claim 7, wherein the negatively charged polyelectrolyte polymer is selected from the group consisting of a salt of poly(styrene sulfonate), a salt of a polyacrylic acid, a salt of a polymethacrylic acid, a poly(2-acrylamido-2-methyl-1-propanesulfonic acid) and a salt of a poly(vinylbenzenephosphonic acid).

9. The coated carbon-sulfur composite according to claim 5, wherein the ionically charged polymer of C) having a charge opposite to the charge of the layer B) and equal to the charge of the coating A) of the core is a polymer having ammonium groups.

10. The coated carbon-sulfur composite according to claim 9, wherein the polymer having ammonium groups is selected from the group consisting of a poly(allylammonium salt), and a poly(diallyldimethylammonium salt).

11. The coated carbon-sulfur composite according to claim 1, wherein a sulfur content of the core is from 5 to 90% by weight.

12. An electrode comprising a current collector and the coated carbon-sulfur composite according to claim 1.

13. An electrochemical cell comprising the electrode according to claim 12 as a cathode.

14. A battery comprising the electrode according to claim 12 as a cathode and further comprising an anode comprising an active material selected from the group consisting of carbon, silicon, lithium and magnesium.

15. A lithium-sulfur battery comprising the electrode according to claim 12 as a cathode.

* * * * *